US007208093B2

United States Patent
Berg et al.

(10) Patent No.: US 7,208,093 B2
(45) Date of Patent: Apr. 24, 2007

(54) CHROMATOGRAPHIC TWO-LAYER PARTICLES

(75) Inventors: Hans Berg, Uppsala (SE); Philippe Busson, Uppsala (SE); Mats Carlsson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 267 days.

(21) Appl. No.: 10/526,088

(22) PCT Filed: Aug. 18, 2003

(86) PCT No.: PCT/SE03/01284

§ 371 (c)(1),
(2), (4) Date: Feb. 23, 2005

(87) PCT Pub. No.: WO2004/020994

PCT Pub. Date: Mar. 11, 2004

(65) Prior Publication Data

US 2005/0242037 A1 Nov. 3, 2005

(30) Foreign Application Priority Data

Aug. 27, 2002 (SE) .................................... 0202551

(51) Int. Cl.
*B01D 15/08* (2006.01)
(52) U.S. Cl. ................ 210/656; 210/198.2; 210/502.1; 502/401; 502/439
(58) Field of Classification Search ................ 210/635, 210/656, 198.2, 502.1; 502/401, 402, 403, 502/404, 439
See application file for complete search history.

(56) References Cited

U.S. PATENT DOCUMENTS

| | | | | | |
|---|---|---|---|---|---|
| 4,773,994 A | * | 9/1988 | Williams | ................ | 210/198.2 |
| 4,778,600 A | * | 10/1988 | Williams | ................ | 210/198.2 |
| 4,855,054 A | * | 8/1989 | Williams | .................... | 210/635 |
| 4,897,197 A | * | 1/1990 | Williams | .................... | 210/635 |
| 4,941,974 A | * | 7/1990 | Williams | ................ | 210/198.2 |
| 4,950,634 A | * | 8/1990 | Williams et al. | ............ | 502/401 |
| 4,950,635 A | * | 8/1990 | Williams et al. | ............ | 502/401 |
| 5,110,784 A | * | 5/1992 | Williams et al. | ............ | 502/401 |
| 5,512,169 A | * | 4/1996 | Williams | ................ | 210/198.2 |
| 5,522,994 A | * | 6/1996 | Frechet et al. | ............. | 210/635 |

(Continued)

FOREIGN PATENT DOCUMENTS

| | | | |
|---|---|---|---|
| WO | WO 98/33572 | * | 8/1998 |
| WO | WO 98/39094 | * | 9/1998 |

*Primary Examiner*—Ernest G. Therkorn
(74) *Attorney, Agent, or Firm*—Yonggang Ji

(57) ABSTRACT

The present invention is a method of producing a chromatographic separation matrix, wherein porous polymeric particles comprised of two layers with different properties are prepared in a two-phase system by (a) providing porous polymeric particles with reactive groups on their surfaces; (b) washing said particles with a first solvent and draining the particles to enclose a first phase; (c) wetting the outer layer of the particles by adding a second solvent, which is essentially insoluble in the first solvent; (d) reacting the reactive groups in the outer layer by adding a reagent, which is essentially non-reactive in the first solvent; and (e) coupling of chromatographic binding groups to the reactive groups in the inner layer. The invention also encompasses a porous polymer particle suitable for use as a chromatographic separation matrix and a process of separation, wherein a matrix according to the invention is used.

13 Claims, 2 Drawing Sheets

U.S. PATENT DOCUMENTS

| | | | |
|---|---|---|---|
| 5,545,317 A * | 8/1996 | Williams | 210/198.2 |
| 5,559,039 A * | 9/1996 | Williams | 436/161 |
| 6,426,315 B1 * | 7/2002 | Bergstrom et al. | 502/159 |
| 6,428,707 B1 * | 8/2002 | Berg et al. | 210/661 |
| 6,572,766 B1 * | 6/2003 | Bergstrom et al. | 210/198.2 |
| 2005/0242037 A1 * | 11/2005 | Berg et al. | 210/656 |

* cited by examiner

CHROMATOGRAPHIC TWO-LAYER PARTICLES

CROSS REFERENCE TO RELATED APPLICATIONS

This application is a filing under 35 U.S.C. §371 and claims priority to international patent application number PCT/SE2003/001284 filed Aug. 18, 2003, published on Mar. 11, 2004 as WO 2004/020994 and also claims priority to patent application number 0202551-8 filed in Sweden on Aug. 27, 2002; the disclosures of which are incorporated herein by reference in their entireties.

TECHNICAL FIELD

The present invention relates to a method of producing porous polymeric particles for use as chromatographic matrices, which particles are comprised of two layers of different properties. The invention also relates to such particles as such as well as to a chromatographic process wherein such particles are used.

BACKGROUND

The term chromatography embraces a family of closely related separation methods. Such methods are all based on the feature that two mutually immiscible phases are brought into contact, wherein one phase is stationary and the other mobile. Chromatography can be used either to purify a liquid from a contaminating compound or to recover one or more product compounds from a liquid.

One area wherein chromatography has recently become of great interest is in the biotechnological field, such as for large-scale economic production of novel drugs and diagnostics. Also, the purification of proteins has recently become of even more importance due to the opening of the field of proteomics, wherein the function of proteins expressed by the human genome is studied. Generally, proteins are produced by cell culture, either intracellularly or secreted into the surrounding medium. Since the cell lines used are living organisms, they must be fed with a complex growth medium, containing sugars, amino acids, growth factors, etc. Separation of the desired protein from the mixture of compounds fed to the cells and from the by-products of the cells themselves to a sufficient purity, e.g. for use as a human therapeutic, poses a formidable challenge.

Conventionally, cells and/or cell debris has been removed by filtration. Once a clarified solution containing the protein of interest has been obtained, its separation from the other components of the solution is usually performed using a combination of different chromatographic techniques. These techniques separate mixtures of proteins on the basis of their charge, degree of hydrophobicity, affinity properties, size etc. Several different chromatography matrices are available for each of these techniques, allowing tailoring of the purification scheme to the particular protein involved.

In order to reduce the number of steps required to obtain a product from a cell culture or lysate, improved chromatographic techniques have been presented. For example, an attempt to avoid the step of removing cells and/or cell debris has been made in a technique known as expanded bed chromatography. Expanded bed chromatography is a non-packed bed technique, wherein a matrix, preferably in the form of particles, is brought to a fluidised or expanded state by applying an upward flow of fluid. The solution comprising the compound to be isolated is subsequently introduced into the flow. (For an illustrative use of expanded bed chromatography, see e.g. International patent application WO 98/33572 (Amersham Pharmacia Biotech AB)). It has been shown that in such an expanded bed, cells are in principle allowed to pass through the bed while the desired compound is adsorbed to an appropriate ligand on the particles. However, problems can arise in ion chromatography, in the case where the cell surface and the binding groups of the matrix carry opposite charges. Aggregates are then formed, which may lead to collapse of the expanded bed and thus inducing a decrease of the protein capacity.

An alternative way of improving the available methods for separation of proteins and similar compounds is by improved matrix materials. To this end, matrices that exhibit more than one functionality and hence can adsorb more than one compound selectively have been suggested.

Thus, U.S. Pat. No. 5,522,994 discloses a process for separating molecules of two different sizes from a sample, wherein a separation medium that exhibits at least two different types of functionalities is used. Such a medium can be prepared by treating a porous material having reactive groups within its pores with a modifying agent of a size that penetrates into only certain pores of the porous material. Thus, the modifying agent will then chemically modify the reactive groups only within the pores so penetrated.

WO 98/39094 discloses an alternative use of steric effects in order to provide a separation medium with different properties. In this case, the surface of a porous matrix has been covered with a polymer, which is of such a molecular weight that it cannot penetrate into the micropore system of the matrix. The matrix itself is preferably agarose derivatised with dextran in the pores and optionally functionalised. The polymer that covers the surface can for example also be dextran, however of a larger molecular weight, cellulose or the like. In some cases, the polymer that covers the surface has been functionalised before being attached to the matrix. Thus, the purpose of the polymer surface layer is to sterically prevent compounds that are above a certain size to from passing through towards the inner micropores. By providing the polymer with functionalities that differ from the ones present in the micropore system, a system can be created, wherein smaller compounds that adsorb within the micropores are prevented from adsorbing to the polymer on the surface. The matrices disclosed are useful for isolation of nucleic acids, proteins and other organic and inorganic compounds.

WO 98/39364 describes a process of introducing a second functionality in layers in a porous matrix. This is accomplished by contacting said matrix with a reagent, which reacts with ligands on the matrix surface at a higher reaction rate than it diffuses into the matrix. The reactivity is usually influenced by solvent, pH etc and the diffusion through the matrix will depend upon the chemical nature of matrix and reagent. Accordingly, the process results in a matrix wherein the original ligands are still present within the inner pore system while the added reagent has provided another functionality in an outer layer. The thickness of the outer layer will then be depending on the amount of reagent added. The preferred matrix is agarose, and the reagent can be bromine according to conventional methods.

SUMMARY OF THE PRESENT INVENTION

One object of the present invention is to provide an alternative method of producing particles for use in chromatographic matrices, which particles are comprised of two defined layers with different properties. This can be achieved by use of a two-phase system, wherein a reagent reactive in only one of the phases is used to modify the outer layer of the chromatographic matrix.

Another object of the present invention is to provide a method for producing chromatographic particles comprised of two layers, which method avoids the need to apply a coating polymer to the particle surface. This can be achieved by a method wherein both layers are prepared from one and the same material and utilising a two-phase system that protects the outer layer during chemical modification of the inner pore system or the inner pore system during chemical modification of the outer layer.

A further object of the present invention is to provide a method of producing chromatographic particles comprised of two layers with different properties, which layers are produced from one and the same material, without any requirement of adding a critical amount of reagent and without any need to determine diffusion and reaction rates of the reagent. This can be achieved by a method wherein the outer layer of the particles is protected by reaction with a reagent, which is not chemically reactive in the inner phase of the particles. Thus, coupling of functional groups to the inner layer can be performed without affecting the protected surfaces of the outer layer.

An additional object of the present invention is to provide particles suitable for use as a chromatographic matrix, which are easy to prepare and which are capable of selective adsorption of one desired compounds to binding groups that are sterically prevented from contact with macromolecules such as cells and cell debris during the adsorption process. This can be achieved by providing particles comprised of two layers with different properties, wherein the entire particle is comprised of one material and which presents non-functional surfaces in the outer layer. A specific object of the invention is to provide particles as described above, which are capable of repelling macromolecules during a chromatographic adsorption process. This can be achieved by particles comprised of two defined layers, wherein the outer layer has been modified and provided with groups that chemically repel the macromolecules, such as negatively charged groups.

Yet another object of the present invention is to provide a process of expanded bed adsorption (EBA), wherein cell and cell debris aggregation is reduced or even eliminated. This can be achieved by use of the particles according to the present invention which are provided with negatively charged groups on the outer layer and hence repel cells, cell debris and nucleic acids.

The above described and other objects of the invention are more specifically achieved as defined in the appended claims. Further embodiments and advantages of the present invention will appear from the detailed description that follows below.

DETAILED DESCRIPTION OF THE INVENTION

Figure 1:
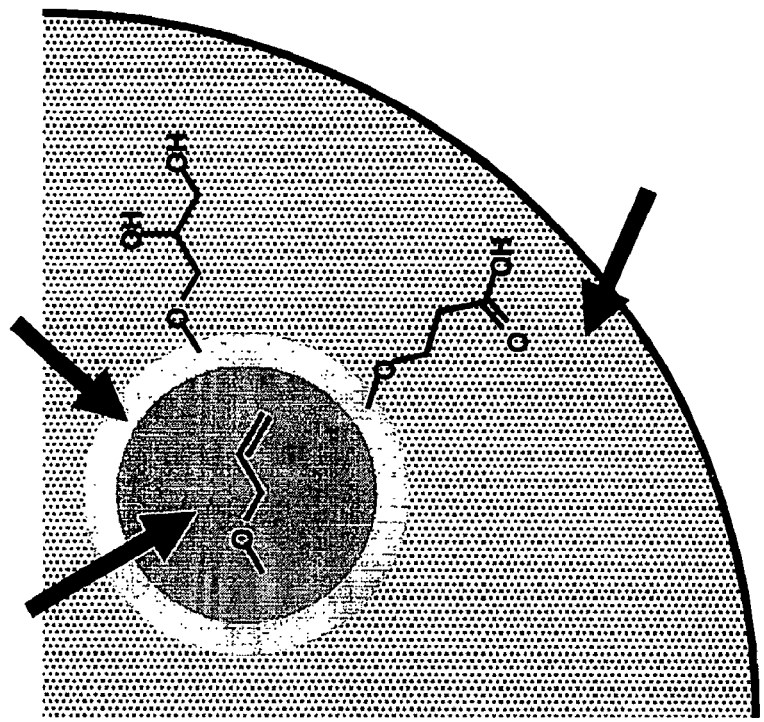
FIG. 1 is a schematic drawing of a two-phase system according to the invention used for oxidation of the allyl groups at the surface of a particle.
Figure 1:
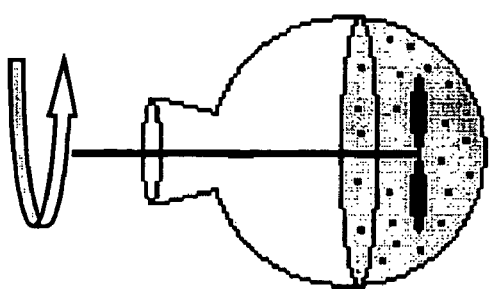

A first aspect of the present invention is a method of producing a chromatographic separation matrix, wherein porous polymeric particles comprised of two layers with different properties are prepared in a two-phase system by (a) providing at least one porous polymeric particle that presents reactive groups on its pore surfaces and its external surface;

(b) washing said particle with a first solvent and draining the particle to enclose a first phase;

(c) wetting the enclosing outer layer of the particle by adding a second solvent, which is essentially insoluble in the first solvent, to provide a second phase in the outer layer;

(d) reacting the reactive groups in the outer layer by adding a reagent, which is essentially non-reactive in the first solvent; and (e) coupling of chromatographic binding groups to the reactive groups in the inner layer.

The part of the particle enclosed in step (b) will herein be denoted the "inner layer" of the particle, while the "outer layer" refers to the rest of the particle. When the surfaces of the outer layer is discussed herein, it is understood that the external surface as well as the surfaces of its pore system are encompassed.

In the preferred embodiment, the reactive groups are carbon-carbon double bonds, such as allyl groups, vinyl groups, etc, in which case the reagent can be an oxidising agent. However, other reactive groups that can be envisaged are hydroxy groups, amino groups, carboxy groups, mercapto groups or the like.

The draining in step (b) is performed to remove a sufficient amount of the first solvent to allow the second solvent to wet the particle. The wetting in step (c) can be repeated if required. The reaction in step (d) results in an outer layer, the surfaces of which can be either non-charged or charged, as will be discussed in more detail below. In a preferred embodiment, the present method also comprises a step of washing the particles after step (d) to produce a phase wherein a conventional coupling of binding groups can be performed. In the present context, it is to be understood that the first and the second solvents should be sufficiently insoluble to prevent the reagent used in step (d) from reacting in the phase to which it is not added.

In an advantageous embodiment, the particle is made from a polymer comprising pendent hydroxy (—OH) groups, such as agarose. Porous and chemically cross-linked agarose particles are easily prepared by the skilled person in this field according to well-known methods. However, other materials can alternatively be used, such as silica, styrene, divinyl benzene etc. As the skilled person in this field will realise, if synthetic polymers such as the last-mentioned two are used, a step that renders the particle surface hydrophilic will be required, such as adding OH-groups by conventional methods.

Alternatively, a commercial product is used as starting material, such as Streamline™ A 300 or Sepharose™ 6FF (both from Amersham Biosciences AB, Uppsala, Sweden). Allylation of native polymers, such as agarose, is well known in the field and is easily performed by the skilled person in this field. In an advantageous embodiment of the present method, the allylation is provided by reacting the hydroxy groups with allyl glycidyl ether (AGE). This embodiment will be described in the Experimental part below.

In one embodiment, the reagent is reactive in aqueous phases. An advantageous reagent in this embodiment is the oxidising agent potassium permanganate ($KMnO_4$), but other oxidising agents such as boron hydride, chromium oxide, osmium tetraoxide, selenium oxide can alternatively be used.

In an alternative embodiment, the reagent is reactive in organic phases. The skilled person in this field can select a suitable reagent, such as the above-mentioned, which however will require modification of the solution. For example, phase-transfer assisted oxidation of allyl groups by $KMnO_4$ can be performed in non-polar solvents such as benzene and dichloromethane by complexing the potassium ion with a crown ether or by replacing it with a quaternary ammonium or phosphonium ion.

In one embodiment, the first solvent enclosed in step (b) is an organic solvent. The organic solvent may be toluene, hexane, dichloromethane or any other well known organic solvent that is insoluble or essentially insoluble in aqueous phases. In this embodiment, the allylated particle is preferably washed with an alcohol, such as ethanol, before draining e.g. on a glass filter. Accordingly, in this embodiment, the wetting according to step (c) is performed by adding the particle to an aqueous solution.

In an alternative embodiment, the first solvent enclosed in step (b) is an aqueous solvent, such as a water solution. Accordingly, in this embodiment, the wetting according to step (c) is performed by adding the particle to an organic solvent, as exemplified above.

In the preferred embodiment, the aqueous phase comprises an emulgator, such as Dextran™ T500 (Amersham Biosciences AB, Uppsala, Sweden). As the skilled person in this field will realise, the function of the emulgator is to remove the toluene from the outer layer. Accordingly, the skilled person in this field will realise that the amount of emulgator should be carefully decided for each case, since the toluene removed and hence the amount of emulgator will indirectly decide the thickness of the outer layer. In the most preferred embodiment, the concentration of the emulgator is about 10% in water.

In a specific embodiment, up to about 30% of the total number of reactive groups as originally present in the particle are reacted in step (d). In a preferred embodiment, 3–20%, such as 4–10%, of the reactive groups are reacted. The outer layer can be considered as a lid, that surrounds a chromatographic particle of conventional composition, hence the denotation "lid beads" that is sometimes used for this kind of particles. Usually, the second layer, i.e. the lid, produced by the method according to the invention is about 3 μm for a particle of a size of about 160 μm.

Step (e), the coupling of chromatographic binding groups to the reactive groups present in the inner layer of the particle, is easily accomplished according to any suitable well-known technique. As mentioned above, if the first solvent is an organic solvent, then the particle is washed e.g. with a solution of aqueous ethanol and water, before step (e), to provide an aqueous environment for the coupling.

Usually, activation, i.e. a step of introducing further reactive groups necessary for functionalisation, is performed. Useful activation agents can be selected from the group that consists of electrophilic agents, nucleophilic agents, and agents acting by free radical chemistry. (See for example WO 98/39364 for a more detailed review of various available activation systems.) In the embodiment where the reactive groups are allyl groups, coupling according to step (e) can be performed by radical activation. In an advantageous embodiment, said activation is performed with bromine, as will be exemplified in the Experimental part below.

The binding groups that are coupled to the surfaces of the activated inner pore system can be any well-known groups conventionally used as ligands in chromatography, such as affinity groups, hydrophobic interaction groups, ion-exchange groups, such as negatively charged cation-exchange groups or positively charged anion exchange groups, etc. Thus, in the present context, the term "binding" refers to any kind of adsorption or coupling. Accordingly, in one embodiment of the present method, the binding groups are ion-exchange groups. In a specific embodiment, the anion exchanger is diethylamine (ANX) or ethylenediamine (EDA), as exemplified in the Experimental part below.

As mentioned above, the reaction in step (d) results in an outer layer that presents a surface, which can be either non-charged or charged. The skilled person in this field will easily select the appropriate starting materials and reagents to provide a desired property on the surface. For example, if the reactive groups are allyl groups, carboxy (—COOH) and/or hydroxy (—OH) groups can be provided on the surfaces of the outer layer. As is well known, there are many conventional methods for coupling a binding group to an OH group. A surface comprised of COOH groups will be of a weak negative charge. Alternatively, binding groups can also be coupled to COOH groups, if a further modification of the surface is desired.

Thus, a further aspect of the present invention is a method for producing a two-functional or bifunctional chromatographic separation matrix, which method is as defined above together with a further step of modifying the groups in the outer layer and/or a coupling of chromatographic binding groups to the outer layer. In the most advantageous embodiment, the groups in the outer layer are of the same charge as that of compounds that are undesired in a chromatographic process, such as negatively charged groups to repel cells and cell debris in a process for separation of protein from a cell lysate.

A second aspect of the present invention is a porous polymeric particle suitable for use as a chromatographic separation matrix, which is comprised of two layers with different properties, wherein all of the particle is made from one material. In a specific embodiment, the particle presents a neutral i.e. non-charged or non-functional outer layer. Accordingly, this embodiment is different from the particles described in the above-discussed WO 98/39094, since the present particle presents no polymer coating of a material different from that of the particle. They also differ from the particles resulting from the process described in the above-discussed WO 98/39364, since the surface of those particles will not be neutral.

In a preferred embodiment, the particle according to the invention is produced according to the method described above.

A third aspect of the present invention is a process for separating a desired compound from other components in a solution, which is a chromatographic separation method wherein a matrix produced according to the invention or a matrix comprised of particles according to the invention is used.

In an advantageous embodiment, the process is an expanded bed adsorption (EBA). In this context, it is to be understood that the process can alternatively be another kind of non-packed bed, such as a stirred suspension, which is based on a similar principle as the expanded bed adsorption.

In the most advantageous embodiment, the desired compound is a protein and the solution is a cell lysate. In this embodiment, the outer layer or lid will prevent cell adsorption to the particles.

In a specific embodiment of the present process, the matrix is an anion exchanger. This embodiment becomes especially advantageous due to the need to shield negatively charged cells and cell debris from the cation exchangers' negatively charged binding groups.

A last aspect of the invention is the use of a matrix produced by a method according to the invention or a matrix comprised of particles as described above in expanded bed adsorption.

DETAILED DESCRIPTION OF THE DRAWINGS

FIG. 1 is a schematic drawing of a two-phase system according to the invention used for oxidation of the allyl groups at the surface of a particle. More specifically, allylated particles with a first inner phase comprising toluene and an oxidised surface are shown in an aqueous phase comprised of Dextran™ T500 (Amersham Biosciences AB, Uppsala, Sweden), $KMnO_4$, NaOH and $H_2O_2$.

Figure 2:
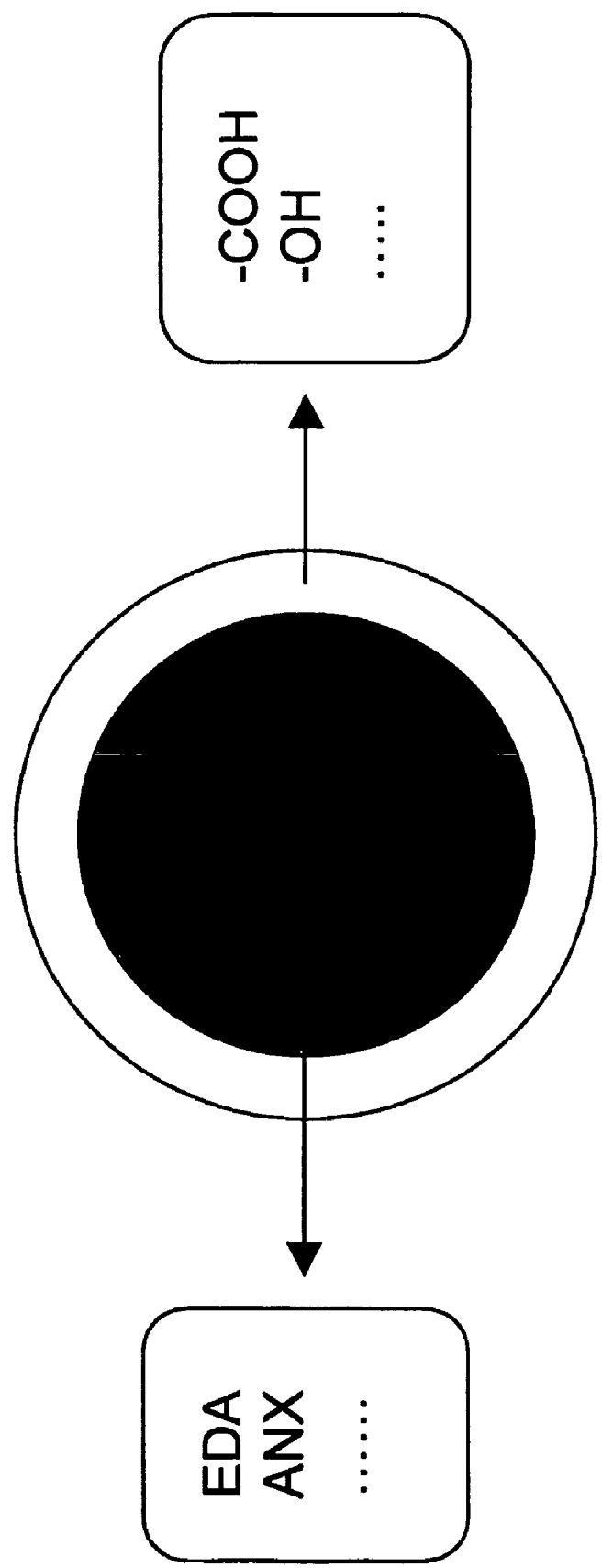
FIG. 2 is a schematic representation of a particle with a neutral i.e. non-functional external outer layer and a ligand-functionalised inner part or layer prepared by a method according to the invention.

FIG. 2 is a schematic representation of a particle with a neutral i.e. non-functional external surface and a ligand-functionalised internal part or layer prepared by a method according to the invention. The outer layer comprises —COOH and/or —OH groups while the inner layer can comprise any ligand such as ethylenediamine (EDA), diethylamine (ANX), etc.

EXPERIMENTAL PART

Below, the present invention will be described by way of examples. However, the present examples are provided for illustrative purposes only and should not be construed as limiting the invention as defined by the appended claims. All references given below and elsewhere in the present specification are hereby included by reference.

Example 1

General Procedure for the Allylation of Streamline™ A 300 with Allyl Glycidyl Ether (AGE)

In a typical synthesis, aqueous NaOH (50%) (200 g), $NaBH_4$ (0.2 g) and $Na_2SO_4$ (8 g) were added to a 1 L three-necked round-bottom flask equipped with a mechanical stirrer. Streamline™ A300 (Amersham Biosciences AB, Uppsala, Sweden) gel (200 g) was washed with distilled water and drained over a glass filter. The beads were subsequently added to the three-necked round-bottom flask under stirring; the reaction mixture was heated up to 50° C., and stirring was continued for 1 h at this temperature. Allyl glycidyl ether (AGE) (300 mL) was then added to the reaction mixture and stirring was continued at 50° C. for 18 h. The reaction mixture was then cooled down to room temperature and brought to pH 6–7 by the addition of concentrated acetic acid. The gel was then filtered on a glass filter and washed successively with distilled water (5*200 mL), EtOH (99.5%) (5*200 mL), and finally distilled water (5*200 mL). The allyl content was determined by first reacting 1 mL of the allylated beads with bromine and then by titrating the resulting beads with silver nitrate. In general, the allyl content was ranging from 200 μmol/mL gel to 250 μmol/mL gel.

Example 2

General Procedure for the Partial Oxidation of the Beads Prepared in Example 1

Allylated Streamline™ A 300 (Amersham Biosciences AB, Uppsala, Sweden) (50 mL) was first washed with EtOH (99.5%) (4*50 mL) and then with toluene (99%) (4*50 mL) on a glass filter. In the last washing with toluene, the beads were partially drained. Distilled water (100 mL) and Dextran T500 (Amersham Biosciences AB, Uppsala, Sweden) solution (10% in water, 100 mL) was added to a 1 L three-necked round-bottom flask. The solution was subjected to mechanical stirring. The partially drained gel was added to the flask and distilled water (50 mL) and Dextran T500 solution (10% in water, 50 mL) was added to the flask. A homogeneous suspension of particles in solution was obtained and stirring was continued for 15 min. Potassium permanganate ($KMnO_4$) (0.81 g, 5.12 mmol, 0.5 eq of initial allyl groups) was added to the flask under continuous stirring. The reaction mixture turned purple and the reaction was allowed to proceed for 15 min. NaOH (50% in water, 20 mL) was then added to the flask and the reaction mixture turned brown simultaneously, indicating the formation of permanganate dioxide aggregates. The reaction was allowed to proceed for 1 h at room temperature. Concentrated acetic acid (approximately 10 mL) was then added to the mixture until the pH equalled 5. Aqueous $H_2O_2$ (30% in water) (2 mL) was carefully added to the mixture, which turned grey. The gel was then filtered on a glass filter, washed with distilled water (5*50 mL), EtOH (99.5%) (5*50 mL), and finally distilled water (5*50 mL). The allyl content was determined according to the procedure described in example 1. In general, the allyl content was decreased by 5 to 20% as compared to the initial allyl content (Table 1).

Example 3

General Procedure for the Bromination of the Beads Prepared in Example 2

The bromination of the remaining allyl groups of partially oxidised Streamline™ A 300 (Amersham Biosciences AB, Uppsala, Sweden) was performed as follows. Sodium acetate (0.1 g) was dissolved in distilled water (10 mL) in a 250 mL three-necked round-bottom flask equipped with a mechanical stirrer. Partially oxidised gel (40 mL, drained) and distilled water (40 mL) were then added to the flask, and the mixture was subjected to rapid stirring for 15 min at room temperature. Bromine was then added drop by drop to the reaction vessel until a persistent yellow colour was obtained (approximately 2 mL $Br_2$). Stirring was continued for 15 min. Sodium formate was then added until the yellow colour disappeared. The gel was subsequently washed with distilled water (5*50 mL) on a glass filter. The brominated gel was directly used for derivatisation to anion exchanger.

Example 4

General Procedure for the Derivatisation to Anion Exchangers

Example 4-1

Coupling of Diethylamine (ANX)

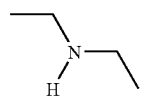

Typically, brominated gel prepared in example 3 (50 mL, drained), diethylamine (20 mL), and distilled water (20 mL)

were added to a 500 mL three-necked round-bottom flask and the mixture was subjected to mechanical stirring at room temperature for about 15 min. Then pH was adjusted to 11.5 with conc. HCl. NaBH$_4$ (0.13 g) was then added to the flask and the reaction was allowed to proceed at room temperature for 18 h. The reaction was then stopped by addition of conc. acetic acid. Finally, the gel was washed with distilled water (10*50 mL) on a glass filter. In general, the ion exchanger capacity for the ANX gels was ranging from 78 μmol/mL gel to 141 μmol/mL gel.

Example 4-2

Coupling of Ethylenediamine (EDA)

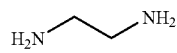

Typically, brominated gel prepared in example 3 (50 mL, drained), ethylenediamine (75 mL), and distilled water (30 mL) were added to a 500 mL three-necked round-bottom flask and the mixture was subjected to mechanical stirring at room temperature for about 15 min. The reaction was then stirred at 60° C. for 18 h. The reaction mixture was cooled down to room temperature and neutralise with conc. acetic acid while keeping the flask in an ice bath. Finally, the gel was washed with distilled water (10*50 mL) on a glass filter. In general, the ion exchanger capacity for the EDA gels was ranging from 166 μmol/mL gel to 224 μmol/mL gel.

TABLE 1

| Prototype | Allyl content before partial oxidation (μmol/mL gel) | Allyl content after partial oxidation (μmoL/mL gel) | Allyl groups oxidised (%) |
|---|---|---|---|
| ANX 1 | 222 | 196 | 12 |
| ANX 2 | 222 | 177 | 20 |
| ANX 3 | 203 | 198 | 3 |
| EDA 1 | 201 | 190 | 6 |
| EDA 2 | 201 | 190 | 6 |
| EDA 3 | 203 | 198 | 3 |

Example 5

Cell Adsorption Measurements

Cell adsorption measurements were performed on different prototypes. The results are reported in table 2. The results are given as a percentage of cells in the flow through fraction (FT) and in the eluted fraction (E) at different NaCl concentrations. The gels named REF. ANX and REF. EDA correspond to the gels prepared according to standard methods by allylation of Streamline™ A 300 (Amersham Biosciences AB, Uppsala, Sweden), bromination and coupling of the corresponding anion exchangers, i.e. in principle as described above but without partial oxidation of the outer layer.

TABLE 2

| | 0 mM NaCl | | 25 mM NaCl | | 50 mM NaCl | | 100 mM NaCl | |
|---|---|---|---|---|---|---|---|---|
| Prototype | % FT | % E | % FT | % E | % FT | % E | % FT | % E |
| REF. ANX | 2 | 101 | 2 | 99 | 2 | 96 | 3 | 54 |
| ANX 1 | 27 | 16 | 89 | 15 | 74 | 16 | 73 | 4 |

TABLE 2-continued

| | 0 mM NaCl | | 25 mM NaCl | | 50 mM NaCl | | 100 mM NaCl | |
|---|---|---|---|---|---|---|---|---|
| Prototype | % FT | % E | % FT | % E | % FT | % E | % FT | % E |
| ANX 2 | 19 | 40 | 44 | 1 | 46 | 2 | 73 | 7 |
| ANX 3 | 25 | 16 | 78 | 5 | 43 | 2 | 94 | 0 |
| REF. EDA | 1 | 17 | 1 | 18 | 2 | 16 | 1 | 40 |
| EDA 1 | 30 | 0 | 48 | 0 | 77 | 2 | 82 | 4 |
| EDA 2 | 67 | 2 | 67 | 1 | 78 | 0 | 78 | 2 |
| EDA 3 | 79 | 0 | 81 | 0 | 77 | 1 | 84 | 0 |

What is claimed is:

1. A method of producing a chromatographic separation matrix of porous polymeric particles including two layers with different properties said method comprising:
   (a) providing at least one porous polymeric particle that presents reactive groups on its pore surfaces and on its external surface;
   (b) washing said particle with a first solvent and draining the solvent to obtain a first phase enclosed in said at least one particle;
   (c) wetting an enclosing outer layer of the particle by adding a second solvent, which solvent is essentially insoluble in the first solvent, to provide a second phase on the outer layer;
   (d) reacting the reactive groups in the outer layer by adding a reagent, which is essentially non-reactive in the first solvent; and
   (e) coupling chromatographic binding groups to the reactive groups in the inner layer.

2. The method of claim 1, wherein the reactive groups are carbon-carbon double bonds.

3. The method of claim 1, wherein the particle is made from a polymer comprising pendent hydroxy groups.

4. The method of claim 3, wherein the particle in step (a) is made by allylation of the pendent hydroxy groups with allyl glycidyl ether (AGE) to provide reactive allyl groups.

5. The method of claim 1, wherein the reagent added in step (d) is an oxidizing agent that is reactive in aqueous phases.

6. The method of claim 1, wherein the reagent added in step (d) is an oxidizing agent that is reactive in organic phases.

7. The method of claim 1, wherein the first solvent enclosed in the particle is an organic solvent.

8. The method of claim 1, wherein the first solvent enclosed in the particle is an aqueous solution.

9. The method of claim 8, wherein the aqueous solution includes an emulgator.

10. The method of claim 1, wherein up to about 30% of the reactive groups as originally present in the particle are reacted in step (d).

11. The method of claim 4, wherein the coupling according to step (e) is performed by radical activation of the allyl groups to allow coupling of binding groups.

12. The method of claim 1, wherein the binding groups of step (e) are ion exchange groups.

13. The method of claim 1, further comprising modifying the groups in the outer layer and coupling the chromatographic binding groups to the surface thereby producing a bifunctional chromatographic separation matrix.

* * * * *